United States Patent
Paprotny

(10) Patent No.: US 11,841,307 B2
(45) Date of Patent: Dec. 12, 2023

(54) PARTICULATE MATTER SENSOR

(71) Applicant: THE BOARD OF TRUSTEES OF THE UNIVERSITY OF ILLINOIS, Urbana, IL (US)

(72) Inventor: Igor Paprotny, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 732 days.

(21) Appl. No.: 16/348,790

(22) PCT Filed: Nov. 9, 2017

(86) PCT No.: PCT/US2017/060920
§ 371 (c)(1),
(2) Date: May 9, 2019

(87) PCT Pub. No.: WO2018/089674
PCT Pub. Date: May 17, 2018

(65) Prior Publication Data
US 2019/0293538 A1    Sep. 26, 2019

Related U.S. Application Data

(60) Provisional application No. 62/457,559, filed on Feb. 10, 2017, provisional application No. 62/437,105, (Continued)

(51) Int. Cl.
*G01N 15/06* (2006.01)
*G01N 1/40* (2006.01)
(Continued)

(52) U.S. Cl.
CPC ....... *G01N 15/0606* (2013.01); *G01N 1/4005* (2013.01); *G01N 15/0255* (2013.01);
(Continued)

(58) Field of Classification Search
CPC ............... G01N 2015/0046; G01N 15/0606
See application file for complete search history.

(56) References Cited

U.S. PATENT DOCUMENTS

| 3,715,298 A | 2/1973 | Goodson et al. |
| 6,205,842 B1 * | 3/2001 | Patashnick ......... G01N 15/0656 436/178 |

(Continued)

FOREIGN PATENT DOCUMENTS

GB    2506991 A    4/2014

OTHER PUBLICATIONS

The International Search Report (ISR) with Written Opinion for PCT/US2017/060920 dated Apr. 13, 2018, pp. 1-15.

*Primary Examiner* — Jamel E Williams
*Assistant Examiner* — Alex T Devito
(74) *Attorney, Agent, or Firm* — McDonnell Boehnen Hulbert & Berghoff LLP

(57) ABSTRACT

Microfabricated PM sensors measure concentrations of particulate matter (PM) in air. Some sensors improve the accuracy of measurements by accounting for the effect of ambient conditions (e.g., temperature or humidity) on mass-sensitive elements employed to determine a mass of the PM in a stream of air. Some sensors improve the accuracy of measurements by controlling humidity in the stream of air measured by mass-sensitive elements. Some sensors employ a plurality of mass-sensitive elements to extend the useful life of the PM sensor. Some sensors employ one or more mass-sensitive elements and heating elements to cause deposition and allow measurement of different sizes of PM. Some sensors can measure mass concentration of coarse PM in addition to fine PM in a stream of air. Some sensors control the flow rate of a stream of air measured by mass-sensitive
(Continued)

elements. Some sensors include features to mitigate electromagnetic interference or electromagnetic signal loss.

25 Claims, 14 Drawing Sheets

Related U.S. Application Data filed on Dec. 21, 2016, provisional application No. 62/419,595, filed on Nov. 9, 2016.

(51) Int. Cl.

| | | |
|---|---|---|
| *G01N 29/02* | (2006.01) | |
| *G01N 29/036* | (2006.01) | |
| *G01N 21/17* | (2006.01) | |
| *G01N 29/44* | (2006.01) | |
| *H01J 49/26* | (2006.01) | |
| *G01N 15/02* | (2006.01) | |
| *G01N 15/00* | (2006.01) | |
| *G01H 11/08* | (2006.01) | |
| *G01N 5/02* | (2006.01) | |

(52) U.S. Cl.
CPC .......... *G01N 21/17* (2013.01); *G01N 29/022* (2013.01); *G01N 29/036* (2013.01); *G01N 29/4436* (2013.01); *H01J 49/26* (2013.01); *G01H 11/08* (2013.01); *G01N 5/02* (2013.01); *G01N 2015/0046* (2013.01); *G01N 2291/0215* (2013.01); *G01N 2291/02408* (2013.01)

(56) References Cited

U.S. PATENT DOCUMENTS 8,806,915 B2  8/2014  White et al.
2004/0259267 A1*  12/2004  Gundel ................ G01N 15/06
                                                    436/178

* cited by examiner

PARTICULATE MATTER SENSOR

CROSS-REFERENCE TO RELATED APPLICATIONS

This application is a National Stage Application of International Patent Application No. PCT/US2017/060920, filed Nov. 9, 2017, which claims priority to U.S. Provisional Patent Application No. 62/419,595, filed Nov. 9, 2016, U.S. Provisional Patent Application No. 62/437,105, filed Dec. 21, 2016, and U.S. Provisional Patent Application No. 62/457,559, filed Feb. 10, 2017, the contents of these applications being incorporated entirely herein by reference.

GOVERNMENT LICENSE RIGHTS

This invention was made under CRADA No. 010408 between Aclima Inc. and Lawrence Berkeley National Laboratory operated with government support under Contract No. DE-AC02-05CH11231 awarded by the U.S. Department of Energy. The Government has certain rights in this invention.

BACKGROUND

Airborne particulate matter (PM) pollutants include small solid particles suspended in the atmosphere. PM pollutants may include, for instance, vehicle exhaust, tobacco smoke, coal dust, volcanic ash, or pollen. The size of PM pollutants may range from a few nanometers to many tens of microns. PM pollutants may be harmful to humans because their size allows them to enter the respiratory system or even the bloodstream. PM sensors have accordingly been developed to detect PM pollutants.

Existing PM sensors, however, are not be configured for convenient and portable use in different types of locations. Additionally, existing PM sensors are generally unable to provide reliably accurate measurements of PM pollutants due to variations in temperature, humidity, etc., in different types of locations. Furthermore, existing PM sensors are not suitable for low cost, microscale production.

SUMMARY

Embodiments of the present disclosure relate to the manufacture and/or implementation of microfabricated PM sensors that measure concentrations of micron-sized particulate matter (PM) in air. Addressing the deficiencies of existing PM sensors, embodiments provide enhanced accuracy, sensitivity, ruggedness, manufacturability, and expandability.

For example, an example microfabricated PM sensor may include a first channel that receives the air sample via an air inlet. The PM sensor also includes an air microfluidic circuit in fluid communication with the first channel. The microfluidic circuit provides a fractionator, which divides the air sample into a first airstream that continues in the first channel and one or more second airstreams that flow into one or more respective second channels. The second channel(s) extend from the first channel at an angle. Due to inertial forces, PM having a size less than a threshold size can flow through the angle and into the second channel(s) with the second airstream(s). Meanwhile, the PM having a size greater than the threshold size generally cannot flow into the second channel(s) and thus continue with the first airstream. As such, the first and second channels extend from a fractionator that selects for particular sizes of PM. A mass-sensitive element may be deployed in a given channel. The PM of the particular size in the given channel is deposited onto the mass-sensitive element which can detect a mass of the PM deposition. The mass concentration of PM of the particular in the air sample can then be determined according to the mass of the PM deposition as indicated by a signal from the mass-sensitive element.

Some embodiments improve the accuracy of measurements by accounting for the effect of ambient conditions, such as temperature or humidity, on mass-sensitive elements employed to determine a mass of the PM in a stream of air. In one example, a sensor for detecting PM pollutants includes a body defining a main channel configured to receive a stream of air from outside the body via one or more fractionators configured to select for a particular size of PM. The sensor includes a plurality of mass-sensitive elements. A first of the mass-sensitive elements is disposed in the main channel and is configured to receive a deposition of PM from the stream of air and to provide a first signal indicating a mass of the PM deposition. A second of the mass-sensitive elements does not receive the PM deposition and is configured to provide a second signal indicating an effect of one or more ambient conditions on the mass-sensitive elements.

Some embodiments improve the accuracy of measurements by controlling humidity in the stream of air measured by mass-sensitive elements. In one example, a sensor for detecting PM pollutants includes a body including one or more walls defining a main channel. The main channel includes an inlet through which a stream of air from outside the body enters the main channel via one or more fractionators configured to select for a particular size of PM. The sensor includes at least one mass-sensitive element disposed downstream of the inlet in the main channel and configured to receive a deposition of PM from the stream of air and to provide a first signal indicating a mass of the PM deposition. The one or more walls include one or more drying elements disposed upstream of the at least one mass-sensitive element. The one or more drying elements are configured to reduce a humidity associated with the stream of air from a first humidity amount at the inlet to a second humidity amount at the at least one mass-sensitive element.

In another example, a sensor for detecting PM pollutants includes a body including one or more walls defining a main channel. The main channel includes an inlet through which a stream of air from outside the body enters the main channel via one or more fractionators configured to select for a particular size of PM. The sensor includes at least one mass-sensitive element disposed downstream of the inlet in the main channel and configured to receive a deposition of PM from the stream of air and to provide a first signal indicating a mass of the PM deposition. The sensor includes one or more cooling elements disposed along the main channel and upstream of the at least one mass-sensitive element. The one or more cooling elements are configured to increase a relative humidity associated with the stream of air from a first relative humidity at the inlet to a second relative humidity at the one or more cooling elements.

Some embodiments employ a plurality of mass-sensitive elements to extend the useful life of the PM sensor. In one example, a sensor for detecting PM pollutants includes a body defining a channel configured to receive a stream of air from outside the body via one or more fractionators configured to select for a particular size of PM. The sensor includes a plurality of mass-sensitive elements disposed in the channel. A first of the mass-sensitive elements is configured to receive a deposition of PM from the stream of air and to provide a first signal indicating a mass of the PM deposition. A second of the mass-sensitive elements is configured to receive a second deposition of PM from the stream of air and to provide a second signal indicating a mass of the second PM deposition. The sensor includes a plurality of heating elements. A first of the heating elements is proximate to the first mass-sensitive element and operable to produce a first temperature gradient that causes the first PM deposition on the first mass-sensitive element. A second of the heating elements is proximate to the second mass-sensitive element and operable to produce a second temperature gradient that causes the second PM deposition on the second mass-sensitive element. The first mass-sensitive element and the second mass-sensitive element are alternately operated so that only one of the first mass-sensitive element or the second mass-sensitive element receives at a given time the first PM deposition or the second PM deposition, respectively.

Some embodiments employ one or more mass-sensitive elements and heating elements to cause deposition and allow measurement of different sizes of PM. In one example, a sensor for detecting PM pollutants includes a body defining a channel configured to receive a stream of air from outside the body via one or more fractionators configured to select for a particular size of PM. The sensor includes one or more mass-sensitive elements disposed in the channel. The sensor includes a plurality of heating elements arranged in series in the channel and operable to produce a temperature gradient that causes at least one deposition of PM on one of the mass-sensitive elements. A size of PM in the deposition received by the one mass-sensitive element is determined by the position of the one mass-sensitive element relative to the heating elements, and the mass-sensitive element is configured to provide a signal indicating a mass of the PM deposition.

Some embodiments can determine mass concentration of coarse PM in addition to fine PM in a stream of air. In one example, a sensor for detecting PM pollutants includes a body defining a plurality of channels configured to receive a stream of air from outside the body. The sensor includes a plurality of mass-sensitive elements disposed in the plurality of channels. Each mass-sensitive element is configured to provide a signal indicating a mass of a respective deposition of PM from the stream of air. The plurality of channels includes one or more major channels and a minor channel receiving the stream of air from one or more fractionators. The mass-sensitive elements include one or more first mass-sensitive elements and a second mass-sensitive element. The one or more first mass-sensitive elements are disposed in the one or more major channels. The second mass-sensitive element is disposed in the minor channel. The plurality of channels are configured to cause deposition of PM of a first size on the one or more first mass-sensitive elements and deposition of PM of a second size from the stream of air on the second mass-sensitive element.

Some embodiments control the flow rate of a stream of air measured by mass-sensitive elements. In one example, a sensor for detecting PM pollutants includes a body defining a channel configured to receive a stream of air from outside the body via one or more fractionators configured to select for a particular size of PM. The stream of air passes through the channel at a flow rate. The sensor includes a mass-sensitive element configured to receive a deposition of PM from the stream of air and to indicate a mass of the PM deposition. The sensor includes an air pump coupled to the channel and operable at an adjustable speed that adjusts the flow rate of the stream of air in the channel. The sensor includes one or more sensors configured to determine and provide a signal indicating the flow rate in the channel. The sensor includes circuitry coupled to the air pump and receiving the signal from the one or more sensors. The circuitry is configured to control the flow rate in the channel by adjusting the speed of the air pump in response to the signal from the one or more sensors.

Some embodiments may include features, such as electromagnetic shielding, to mitigate electromagnetic interference (EMI) or electromagnetic signal loss. Such features may ensure compliance with electromagnetic compatibility (EMC) regulations. In one example, a sensor for detecting PM pollutants includes a body defining a channel configured to receive a stream of air from outside the body into the channel via one or more fractionators configured to select for a particular size of PM. The sensor includes at least one mass-sensitive element disposed in the channel and configured to receive a deposition of PM from the stream of air and to provide a measurement signal indicating a mass of the PM deposition. The sensor includes circuitry that receives the measurement signal from the at least one mass-sensitive element and is configured to process the measurement signal and determine a concentration of the PM in the stream of air. The circuitry generates an electromagnetic output signals associated with the determination of the concentration of the PM. The sensor includes means for mitigating loss or noise in the electromagnetic output signals generated by the circuitry.

Some embodiments may employ an in-plane inlet to reduce wall losses when directing a stream of air to a channel including a mass-sensitive element. In one example, a sensor for detecting PM pollutants includes a body including at least a first layer and a second layer. The second layer defines a channel passing between the first layer and the second layer. The channel is configured to receive a stream of air from outside the body. The sensor includes at least one mass-sensitive element disposed in the channel and configured to receive a deposition of PM from the stream of air and to provide a measurement signal indicating a mass of the PM deposition. The sensor includes a fixture coupled to the body providing an inlet for the stream of air, the inlet configured to direct the stream of air into the channel along a plane defined by the second layer without passing through the first layer or the second layer.

DETAILED DESCRIPTION

Figure 1A:
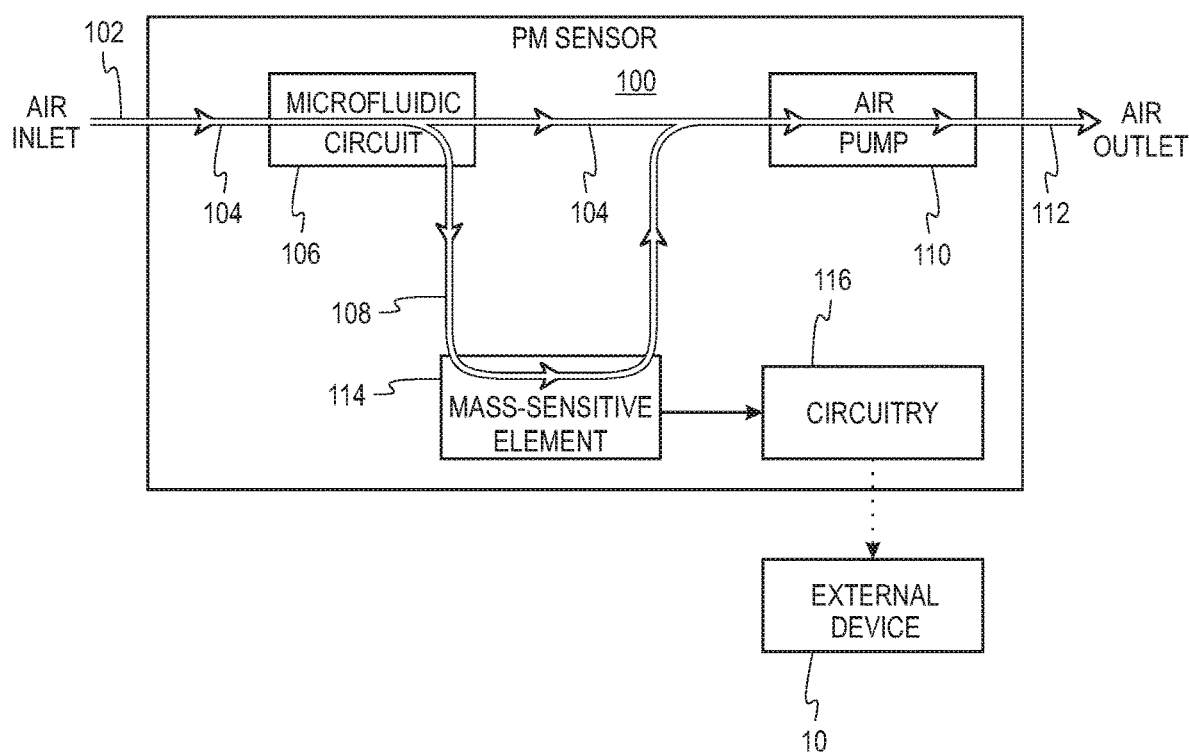
FIG. 1A illustrates an example particulate matter (PM) sensor that can determine mass concentrations of PM in an air sample, according to aspects of the present disclosure.

FIG. 1A illustrates aspects of an example microfabricated particulate matter (PM) sensor 100 that measures concentrations of PM in an air sample. PM pollutants may include, for instance, coal dust, vehicle exhaust, tobacco smoke, volcanic ash, or pollen, which range in size from a few nanometers to many tens of microns. The PM sensor 100 includes a first channel 104 that receives the air sample via an air inlet 102. The PM sensor 100 also includes an air microfluidic circuit 106 in fluid communication with the first channel 104. The microfluidic circuit 106 provides a fractionator, which divides the air sample a first airstream that continues in the first channel 104 and one or more second airstreams that flow into one or more respective second channels 108. The second channel(s) extend from the first channel at an angle. Due to inertial forces, PM having a size less than a threshold size (e.g., $PM_{2.5}$ with aerodynamic diameter less than 2.5 μm) can flow through the angle and into the second channel(s) 108 with the second airstream. Meanwhile, the PM having a size greater than the threshold size generally cannot flow into the second channel(s) 108 and thus continue with the first airstream. As such, the first channel 104 and the second channel(s) 108 extend from a fractionator that selects for particular sizes of PM.

The PM sensor 100 includes an air pump 110 that can create a pressure gradient to draw the air sample through the air inlet 102, the first channel 104, the microfluidic circuit 106, and out of the PM sensor 100 via an air outlet 112. The PM sensor 100 may also include a power source, such as a battery, to power the air pump 110 and any other components of the PM sensor 100.

A mass-sensitive element 114 is disposed in each second channel 108. The selected PM in the second airstream is deposited onto the mass-sensitive element 114. The mass-sensitive element 114 can be employed to measure a mass of the PM deposition. In some embodiments, the mass-sensitive element 114 may be a resonator that has a resonant frequency that changes in response to the mass of PM that is deposited onto the mass-sensitive element 114. For instance, the mass-sensitive element 114 may be a piezo-electric crystal such as a Film Bulk Acoustic Resonator (FBAR). Without PM deposition, the mass-sensitive element 114 may resonate at a higher frequency (e.g., approximately 1.6 GHz). As PM is deposited onto the mass-sensitive element 114, however, the resonant frequency of the mass-sensitive element 114 may decrease proportionally due to the additional mass.

The mass-sensitive element 114 is coupled to circuitry 116 that can determine the changing resonant frequency of the mass-sensitive element 114 in response to the PM deposition. For instance, the circuitry 116 may include a high-speed frequency counter to determine the rate of resonant frequency change for the mass-sensitive element 114. The mass concentration of selected PM in the stream of air can then be determined according to the change in the resonant frequency of the mass-sensitive element 114. The circuitry 116 may be coupled, via wired or wireless communication, to an external device 10 that can further process signals from the circuitry 116 conveying information about the mass concentration of the selected PM.

Figure 1B:
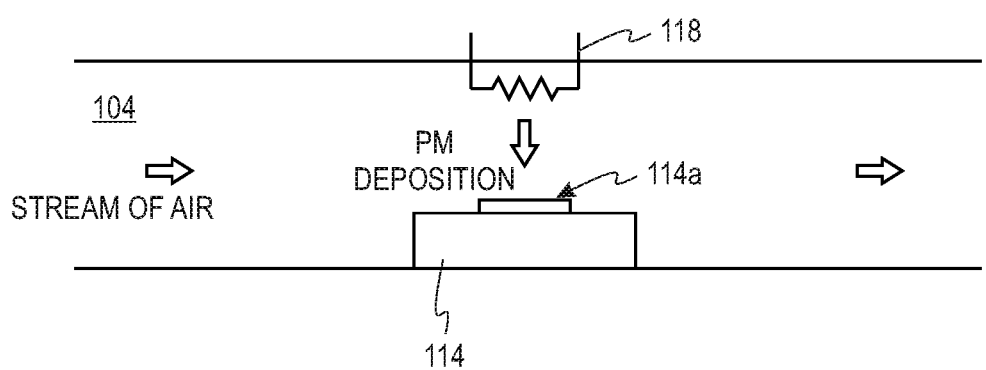
FIG. 1B illustrates an example implementation of a mass-sensitive element and a heating element in a PM sensor to cause deposition of PM on the mass-sensitive element via thermophoresis, according to aspects of the present disclosure.

FIG. 1B illustrates an example implementation of the mass-sensitive element 114 in a mass-sensing region of the second channel 108. The mass-sensitive element 114 includes a collection surface 114a for receiving the PM in the second airstream. The PM sensor 100 also includes a heating element 118 that is disposed in the second channel 108 across from, or similarly proximate to, the mass-sensitive element 114a. For instance, the heating element 108 may be positioned approximately 100 μm from the collection surface 114a. The heating element 118, for instance, may include one or more wires or other resistive elements that can generate heat. When the temperature of the heating element 118 is increased to 100° C., for example, the heating element 118 generates a temperature gradient and acts as a thermophoretic precipitator that causes deposition of the PM on the collection surface 114a. In some embodiments, PM deposition occurs only when the heating element 118 is activated and its temperature reaches a threshold temperature (e.g., 100° C.).

The characteristics of a mass-sensitive element may be affected by ambient conditions. For instance, the resonant frequency of a resonator used as a mass-sensitive element may also depend on ambient temperature and humidity. As such, the measurement of mass associated with PM deposition on the resonator can be vary according to temperature and humidity effects.

Accordingly, some embodiments employ a differential coupling of a plurality of mass-sensitive elements to account for the effect of ambient conditions on the measurement of the mass associated with PM deposition. In particular, an example PM sensor may include a sensor body defining a channel configured to receive a stream of air from outside the body, e.g, via one or more fractionators configured to select for a particular size of PM. The PM sensor includes a plurality of mass-sensitive elements. A first of the mass-sensitive elements is disposed in the channel and configured to receive a deposition of PM from the stream of air. The first mass-sensitive element can provide a first signal indicating a mass of the PM deposition. The PM sensor also includes a second mass-sensitive element that is similar to the first mass-sensitive element, but the second mass-sensitive element does not receive the PM deposition. As such, the second mass-sensitive element can provide a second signal that is not affected by the PM deposition. Thus, the second signal can indicate an effect of one or more ambient conditions on the mass-sensitive elements (including the first mass-sensitive element). As described above, the effect of the one or more ambient conditions on the mass-sensitive elements may include a temperature effect and/or a humidity effect.

In some embodiments, the mass-sensitive elements are resonators. Each mass-sensitive element has a resonant frequency that changes (e.g., FBAR frequency change) in response to the PM deposition and the one or more ambient conditions. The first signal from the first mass-sensitive element reflects a change in the resonant frequency in response to both the PM deposition and the one or more ambient conditions, while the second signal from the second mass-sensitive element reflects a change in the resonant frequency in response to only the one or more ambient conditions. Because the second mass-sensitive element does not receive a PM deposition, any change in its resonant frequency is the result of other effects on the second mass-sensitive element. In particular, the change in resonant frequency for the second mass-sensitive element may be caused by the effect of one or more ambient conditions, such as temperature and/or humidity. Thus, the change in resonant frequency associated with the second mass-sensitive element provides the second signal indicating the effect of the one or more ambient conditions.

The PM sensor may include circuitry that: (i) receives the first signal from the first mass-sensitive element and the second signal from the second mass-sensitive element; (ii) determines the effect of the one or more ambient conditions on the mass-sensitive elements according to the second signal, (iii) corrects the mass of the PM deposition indicated by the first signal according to the effect of the one or more ambient conditions on the mass-sensitive elements, and (iv) determines a concentration of the PM in the stream of air according to the mass of the PM deposition.

Figure 2:
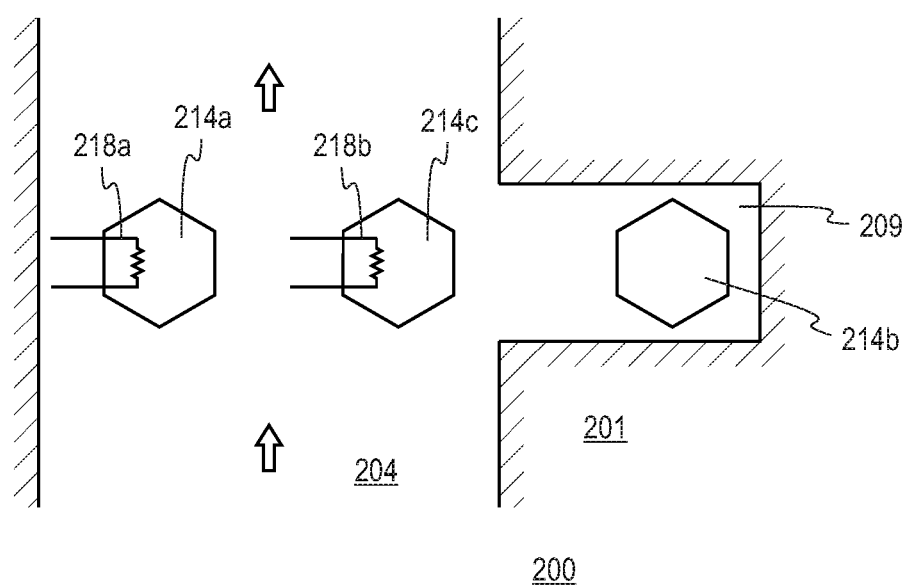
FIG. 2 illustrates an example PM sensor including two mass-sensitive elements that alternately receive a PM deposition in order to determine a PM mass, and another mass-sensitive element that does not receive the PM deposition in order to determine the effect of ambient conditions, according to aspects of the present disclosure.

FIG. 2 illustrates an example PM sensor 200 that accounts for the effect of ambient conditions on the measurement of the mass associated with PM deposition. The PM sensor 200 includes a body 201 that defines a main channel 204 configured to receive a stream of air from outside the body 201, e.g, via one or more fractionators configured to select for a particular size of PM. The body 201 also defines a side channel 209 that extends from the main channel 204.

The PM sensor 200 includes a first mass-sensitive element 214a disposed in the main channel 204 and configured to receive a deposition of PM from the stream of air. The first mass-sensitive element 214a can provide a first signal indicating a mass of the PM deposition. The PM sensor 200 includes a first heating element 218a disposed proximate to the first mass-sensitive element 214a. For instance, the first heating element 218a may be disposed over and face the collection surface of the mass-sensitive element 214a. The first heating element 218a is operable to produce a temperature gradient in the main channel 204 that causes the PM deposition on the first mass-sensitive element 214a.

The PM sensor 200 also includes a second mass-sensitive element 214b that is similar to the first mass-sensitive element 214a, but is disposed in the side channel 209. The second mass-sensitive element is not paired with a heating element so that it does not receive a PM deposition. As described above, the second mass-sensitive element 214b can provide a second signal indicating an effect of one or more ambient conditions on the first mass-sensitive element 214a.

Additionally, the PM sensor 200 includes a third mass-sensitive element 214c disposed in the main channel 204 and a second heating element 218b disposed proximate to the third mass-sensitive element 214c. The second heating element 218b is operable to produce another temperature gradient in the main channel 204 that causes a PM deposition on the third mass-sensitive element 214c. In response, the third mass-sensitive element 214c provides a third signal indicating a mass of the PM deposition. The second signal from the second mass-sensitive element 214b also indicates the effect of the one or more ambient conditions on the third mass-sensitive element 214c. Advantageously, the first heating element 218a and the second heating element 218b can be selectively operated to control the respective PM depositions on the first mass-sensitive element 214a and the third mass-sensitive element 214c. For instance, the first heating element 218a and the second heating element 218b may be operated so that only one of the first mass-sensitive element 214a or the third mass-sensitive element 214c receives the respective PM deposition at a given time. This allows the PM sensor 200 to balance the accumulation of PM on, and slow the fouling of, the first mass-sensitive element 214a and the third mass-sensitive element 214c, thereby extending the useful life of the PM sensor 200.

Figure 3:
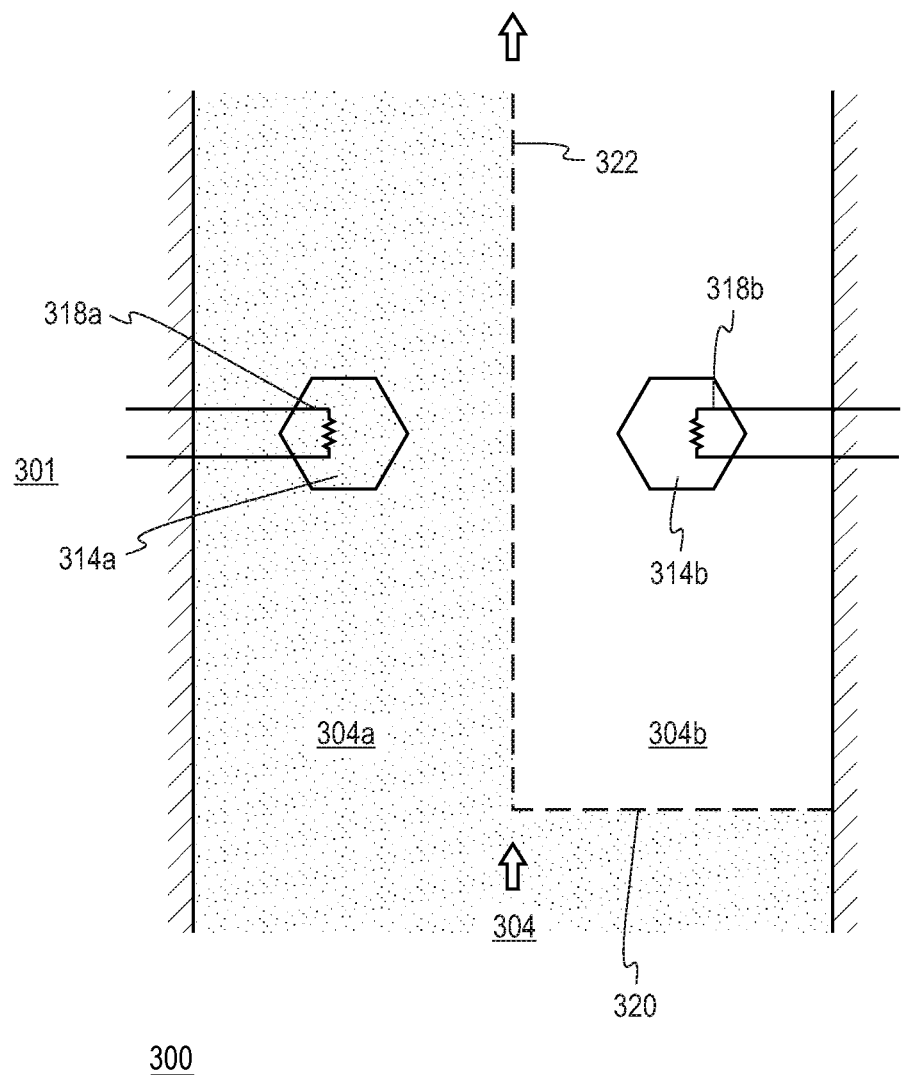
FIG. 3 illustrates an example PM sensor including a mass-sensitive element that receives a PM deposition in order to determine a PM mass, and another mass-sensitive element that does not receive the PM deposition in order to determine the effect of ambient conditions, according to aspects of the present disclosure.

FIG. 3 illustrates another example PM sensor 300 that accounts for the effect of ambient conditions on the measurement of the mass associated with PM deposition. The PM sensor 300 includes a body 301 that defines a channel 304 configured to receive a stream of air from outside the body 301, e.g, via one or more fractionators configured to select for a particular size of PM. The channel 304 includes a first section 304a and a second section 304b.

The PM sensor 300 includes a first mass-sensitive element 314a disposed in the first section 304a of the channel 304. The PM sensor 300 can direct PM in the stream of air to the first section 304a. When the PM is in the first section 304a, the first mass-sensitive element 314a can receive a deposition of the PM. In particular, the PM sensor 300 includes a first heating element 318a proximate to the first mass-sensitive element 314a. The first heating element 318a is operable to produce a temperature gradient that causes the PM deposition on the first mass-sensitive element 314a. Correspondingly, the first mass-sensitive element 314a can provide a first signal indicating a mass of the PM deposition.

In some embodiments, the PM sensor 300 includes an upstream filter 320 shown as an option (dashed line) in FIG. 3 to block the PM from passing into the second section 304b and to direct the PM to the first section 304a. In alternative embodiments, thermophoresis or electrophoresis directs the PM away from the second section 304b and to the first section 304a. Other approaches for concentrating the PM in the first section 304a are described, for instance, in PCT International Patent Application Publication No. WO/2016/164733, filed Apr. 8, 2016, the contents of which are incorporated entirely herein by reference.

In some embodiments, the PM sensor 300 includes a continuous or semi-continuous barrier 322 shown as an option (dashed line) in FIG. 3 to separate the first section 304a and the second section 304b and keep the PM in the first section 304a. Alternatively, the first section 304a and the second section 304b are effectively separated by laminar airflow through the channel 304, where there is little or no diffusion of the PM therebetween.

The PM sensor 300 also includes a second mass-sensitive element 314b disposed in the section 304b of the channel 304. The second mass-sensitive element 314b is similar to the first mass-sensitive element 314a. When the PM is directed to the first section 304a and away from the second section 304b, the PM is not deposited on the second mass-sensitive element 314b. Thus, as described above, the second mass-sensitive element 314b can provide a second signal indicating an effect of one or more ambient conditions on the first mass-sensitive element 314a.

Although the second mass-sensitive element 314b as shown in FIG. 3 does not receive the PM deposition, the PM sensor 300 includes a second heating element 318b proximate to the second mass-sensitive element 314b. When the PM is directed to the first section 304a and away from the second section 304b, the second heating element 318b can be activated, but the PM is still not deposited on the second mass-sensitive element 314b. In some embodiments, however, the PM sensor 300 is reconfigurable so that the PM can be alternatively directed to the second section 304b and away from the first section 300a. For instance, a redirection mechanism, such as thermophoresis or electrophoresis, may be dynamically controlled to redirect the PM to one of the first section 304a and the second section 304b. When the PM sensor 300 is thus reconfigured, PM is not deposited on the first mass-sensitive element 314a. Meanwhile, the second heating element 318b produces a temperature gradient that causes the PM deposition on the second mass-sensitive element 314b. Correspondingly, the second mass-sensitive element 314b can provide a signal indicating a mass of the PM deposition, and the first mass-sensitive element 314a can provide a signal indicating the effect of one or more ambient conditions on the second mass-sensitive element 314b. In general, the PM sensor 300 can be selectively reconfigured so that the first mass-sensitive element 314a or the second mass-sensitive element 314b can alternately receive the PM deposition. The first heating element 318a and the second heating element 318b may remain continuously activated as the PM is alternately directed to the first section 304a or the second section 304b. Advantageously, this allows the PM sensor 300 to balance the accumulation of PM on, and slow the fouling of, the first mass-sensitive element 314a and the second mass-sensitive element 314b, thereby extending the useful life of the PM sensor 300.

In addition to employing a differential coupling of mass-sensitive elements to determine the effect of the one or more ambient conditions, such as temperature and humidity, on the measurement of PM concentration, embodiments may additionally employ separate environmental sensors to measure the one or more ambient conditions. For instance, the environmental sensors can be positioned in the channels with the mass-sensitive elements. The measurements can supplement the manner in which PM concentration is calculated in view of the one or more ambient conditions.

As shown in the embodiments of FIGS. 2-3, PM sensors can control the effects of PM deposition over time by alternately operating a first mass-sensitive element and a second mass-sensitive element so that only one of the first mass-sensitive element or the second mass-sensitive element receives at a given time the first PM deposition or the second PM deposition, respectively. As FIG. 4 illustrates, a PM sensor may employ any number of two or more mass-sensitive elements to extend the useful life of the PM sensor.

Figure 4:
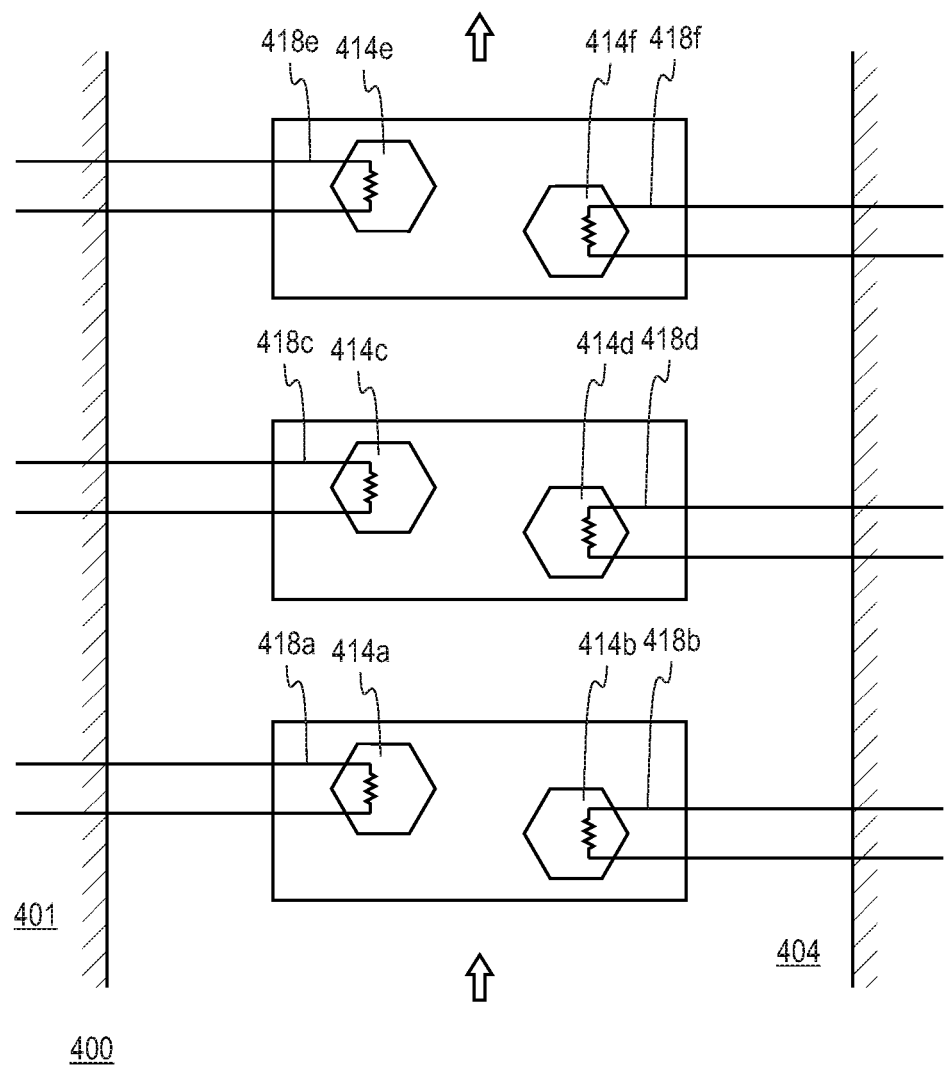
FIG. 4 illustrates an example PM sensor that employs a plurality of mass-sensitive elements to extend the useful life of the PM sensor, according to aspects of the present disclosure.

In particular, FIG. 4 shows an example PM sensor 400 that employs six mass-sensitive elements to extend the useful life of the PM sensor. The PM sensor 400 includes a body 401 that defines a channel 404 configured to receive a stream of air from outside the body 401, e.g., via one or more fractionators configured to select for a particular size of PM. The PM sensor 400 includes mass-sensitive elements 414a-f, each configured to receive a deposition of PM from the stream of air and to provide a signal indicating a mass of the PM deposition. The PM sensor 400 also includes heating elements 418a-f proximate to mass-sensitive elements 414a-f, respectively. Each of the heating elements 418a-f is operable to produce a temperature gradient that causes the PM deposition on the mass-sensitive elements 414a-f, respectively. Because PM deposition in this case occurs only when a heating element thermophoretically directs the PM to a corresponding mass-sensitive element, the heating elements 418a-f can be alternately operated to control the PM deposition on the mass-sensitive elements 414a-f, respectively. Only one of the mass-sensitive elements 414a-f receives the respective PM deposition at a given time.

In some embodiments, each mass-sensitive element 414a-f is employed in series until the mass-sensitive element 414a-f becomes saturated. In other words, when the signal noise becomes too large and Q drops for a given mass-sensitive element 413a-f, the PM sensor 400 switches to another mass-sensitive element 413a-f. If, for instance, the useful life of each mass-sensitive element 414a-f is six months (when saturation occurs), the PM sensor 400 has a useful life that may extend to thirty-six months.

Figure 5:
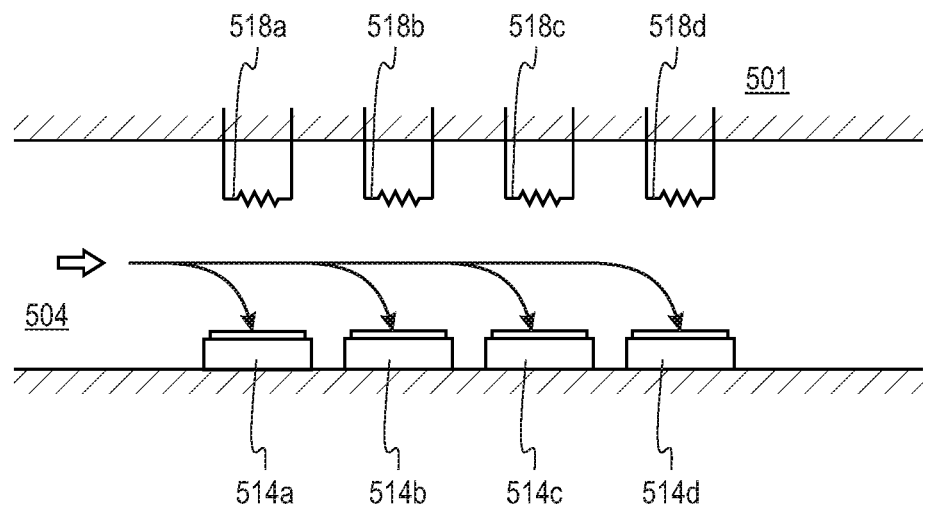
FIG. 5 illustrates an example PM sensor where multiple mass-sensitive elements and corresponding heating elements are arranged to cause deposition of different sizes of PM, according to aspects of the present disclosure.

FIG. 5 illustrates an example PM sensor 500 where multiple mass-sensitive elements and corresponding heating elements are arranged to cause deposition of a distribution of different sizes of PM via thermophoresis (uniform or long thermophoretic field). The PM sensor 500 includes a body 501 defining a channel 504 configured to receive a stream of air from outside the body 501, e.g, via one or more fractionators configured to select for a particular size of PM. The PM sensor 500 includes a plurality of mass-sensitive elements 514a-d arranged in series in the channel 504. The PM sensor 500 also includes a plurality of heating elements 518a-d, where each heating element 518a-d is paired with a respective one of the mass-sensitive elements 514a-d. The heating elements 518a-d are operable to produce a temperature gradient that causes the mass-sensitive elements 514a-d to receive a distribution of different respective sizes of PM. The distribution of sizes of PM in the deposition received by the mass-sensitive elements 514a-d is determined by the position of the mass-sensitive elements 514a-d relative to the heating elements 518a-d. The thermophoresis provided by the heating elements 518a-d preferentially works better on smaller PM. As described above, each mass-sensitive element 514a-d is configured to provide a signal indicating a mass of the respective PM deposition. Accordingly, the PM sensor 500 allows deposited PM to be probed for different sizes of PM, allowing distributions containing potentially greater fractions of larger PM to also be collected. Although FIG. 5 may show four mass-sensitive elements 514a-d/heating elements 518a-d, other embodiments may employ any number of two or more mass-sensitive elements/heating elements.

Figure 6:
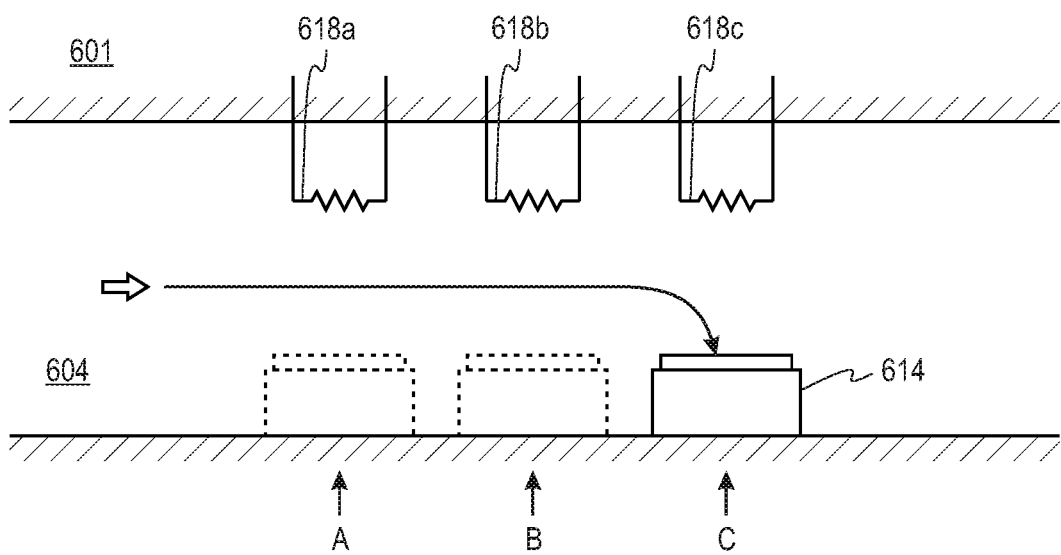
FIG. 6 illustrates an example PM sensor where a single mass-sensitive element and multiple heating elements are arranged to cause deposition of different sizes of PM, according to aspects of the present disclosure.

FIG. 6 illustrates an alternative PM sensor 600 where a single mass-sensitive element and multiple heating elements are arranged to cause deposition of different sizes of PM via thermophoresis. The PM sensor 600 includes a body 601 defining a channel 604 configured to receive a stream of air from outside the body 601, e.g, via one or more fractionators configured to select for a particular size of PM. The PM sensor 600 includes a single mass-sensitive element 614 in the channel 604. The PM sensor 600 also includes a plurality of heating elements 618a-c arranged in series in the channel 604. The heating elements 618a-c are operable to produce a temperature gradient that causes the mass-sensitive element 614 to receive PM of a particular size. The heating elements 618a-c may provide a uniform, or semi-uniform, thermophoretic field that creates distribution of PM where PM of particular sizes are directed to certain positions relative to the heating elements 618a-c. (Such implementation of the heating elements 618a-c may be enhanced if the PM are concentrated according to the techniques disclosed in PCT International Patent Application No. PCT/US16/26657.) Thus, the size of PM in the deposition received by the mass-sensitive element 614 is determined by the position of the mass-sensitive element 614 relative to the heating elements 618a-c. As described above, each mass-sensitive element 614 is configured to provide a signal indicating a mass of the respective PM deposition. Although FIG. 6 may show three heating elements 518a-c, other embodiments may employ any number of two or more heating elements.

As shown in FIG. 6, the mass-sensitive element 614 is at position C, where it can receive PM of a particular size; however, the mass-sensitive element 614 can be alternatively placed at positions A or B, where it can receive PM of other respective sizes. In some embodiments, the mass-sensitive element 614 can be adjustably positioned in situ relative to the heating elements 618a-c (e.g., positions A, B, or C) to receive a selected size of PM. Alternatively, the position of the mass-sensitive element 614 may be determined prior to fabrication and set during fabrication.

Figure 7:
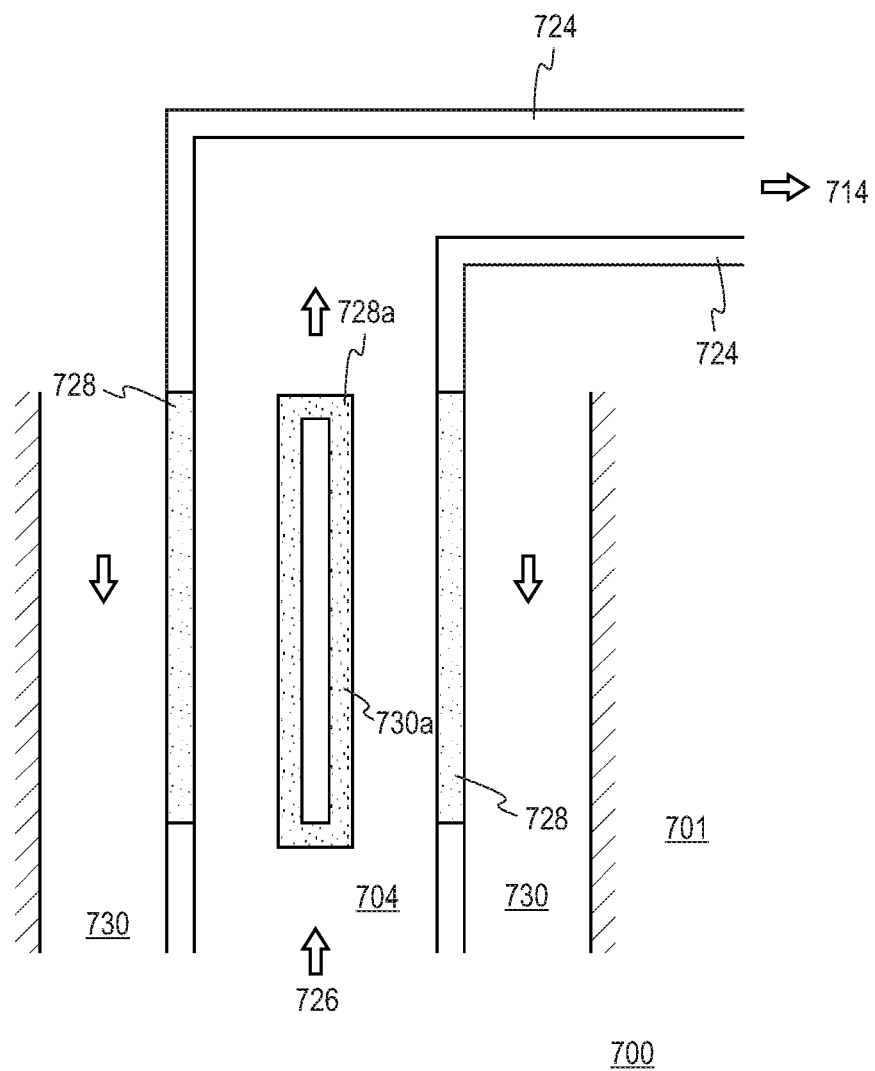
FIG. 7 illustrates an example PM sensor that employs one or more drying elements to minimize humidity effect, according to aspects of the present disclosure.

As described above, the determination of mass associated with a deposition of PM from a stream of air may be affected by humidity. Embodiments may employ additionally or alternatively employ techniques for controlling humidity in a PM sensor. For instance, FIG. 7 illustrates an example PM sensor 700 that employs one or more drying elements to minimize humidity effect. The PM sensor 700 includes a body 701 including one or more walls 724 defining a main channel 704. The main channel 704 includes an inlet 726 through which a stream of air from outside the body 701 enters the main channel 704, e.g, via one or more fractionators configured to select for a particular size of PM. The PM sensor 700 includes at least one mass-sensitive element 714 disposed downstream of the inlet 726 in the main channel 704. The at least one mass-sensitive element 714 is configured to receive a deposition of PM from the stream of air and to provide a first signal indicating a mass of the PM deposition. The one or more walls 724 include drying elements disposed upstream of the at least one mass-sensitive element 714. The drying elements are configured to reduce a humidity associated with the stream of air from a first humidity amount at the inlet 726 to a second humidity amount at the at least one mass-sensitive element 714.

As shown in FIG. 7, the drying elements include moisture-permeable membranes 728. The body 701 also includes one or more dry air channels 730 disposed along the main channel 704. The moisture-permeable membranes 728 are disposed between the main channel 704 and the one or more dry air channels 730. Moisture in the stream of air diffuses from the main channel 704 to the one or more dry air channels 730 via the moisture-permeable membranes 728. Surface area of the moisture-permeable membranes 728 (i.e., surface-to-volume ratio) may be increased for greater drying efficiency. Indeed, as shown in FIG. 7, to increase the surface area of the moisture-permeable membranes 728, the PM sensor 700 includes moisture-permeable membranes 728a formed around a dry air channel 730a disposed in the main channel 704 so that the stream of air flows around the moisture-permeable membranes 728a. Additionally or alternatively, the drying elements may include a desiccant.

Figure 8:
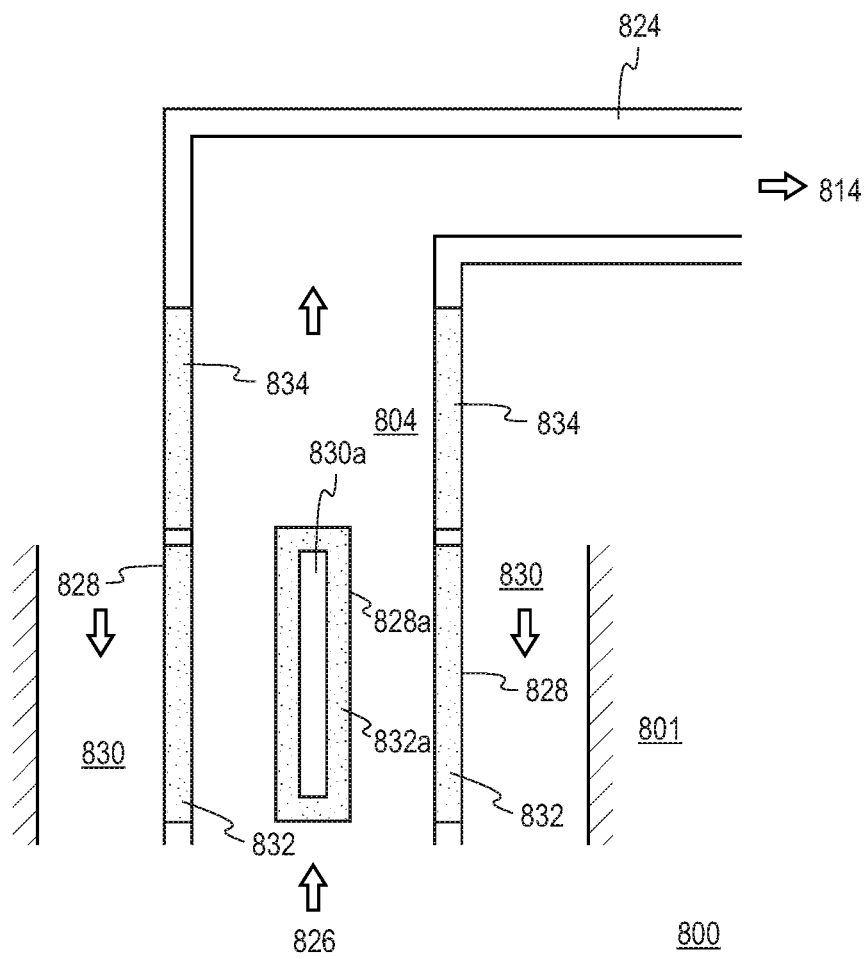
FIG. 8 illustrates an example PM sensor that employs one or more cooling zones to minimize humidity effect, according to aspects of the present disclosure.

FIG. 8 illustrates an example PM sensor 800 that employs one or more cooling zones to minimize the effect of humidity. The PM sensor 800 includes a body 801 with one or more walls 824 defining a main channel 804. The main channel 804 includes an inlet 826 through which a stream of air from outside the body enters the main channel 804, e.g, via one or more fractionators configured to select for a particular size of PM. The PM sensor 800 includes at least one mass-sensitive element 814 disposed downstream of the inlet 826 in the main channel 804. The at least one mass-sensitive element 814 is configured to receive a deposition of PM from the stream of air and to provide a first signal indicating a mass of the PM deposition as described above.

The PM sensor 800 includes one or more cooling elements 832 disposed along the main channel 804 and upstream of the at least one mass-sensitive element 814. The one or more cooling elements 832, for instance, may include thermoelectric coolers. The one or more cooling elements 832 are configured to increase a relative humidity associated with the stream of air from a first relative humidity at the inlet to a second relative humidity at the one or more cooling elements 832. The one or more cooling elements 832 may be combined with, or otherwise coupled to, one or more moisture-permeable membranes 828. The body 801 includes one or more dry air channels 830 disposed along the main channel 804. One or more heating elements may be employed to increase relative humidity further air with the one or more dry air channels 830. The one or more moisture-permeable membranes 828 are disposed between the main channel 804 and the one or more dry air channels 830. Moisture in the stream of air diffuses from the main channel 804 to the one or more dry air channels 830 via the one or more moisture-permeable membranes 828. Advantageously, the one or more cooling elements 832 increase the relative humidity associated with the stream of air to increase the diffusion (i.e., flux) of moisture from the main channel 804 to the one or more dry air channels 830.

Surface area of the moisture-permeable membranes 828 (i.e., surface-to-volume ratio) may be increased for greater cooling efficiency. Indeed, as shown in FIG. 8, to increase the surface area of the moisture-permeable membranes 828, the PM sensor 800 includes moisture-permeable membranes 828a formed about a dry air channel 830a disposed in the main channel 804 so that the stream of air flows around the moisture-permeable membranes 828a. One or more cooling elements 832a are combined with, or otherwise coupled to, one or more moisture-permeable membranes 828a. In some embodiments, the one or more cooling elements 832 may be disposed in hollow fins to increase surface area and cooling efficiency.

Figure 9:
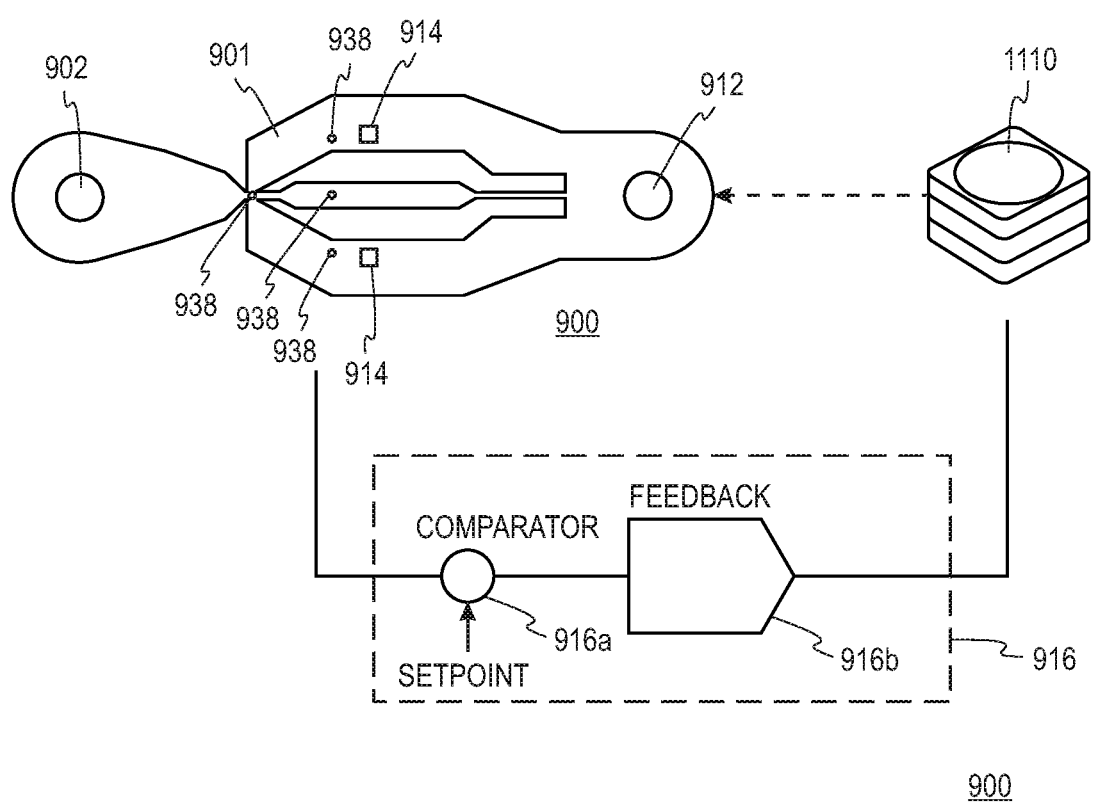
FIG. 9 illustrates an example PM sensor that controls the flow rate of air, according to aspects of the present disclosure.

Additionally, the PM sensor 800 may include one or more heating elements 834 disposed along the main channel 804 between the one or more cooling elements 832 and the at least one mass-sensitive element 814. The one or more cooling elements 832 and the one or more heating elements 834 are operable to further control the humidity associated with the stream of air in the main channel 804. In some embodiments, the one or more heating elements 834 may be disposed in hollow fins to increase surface area and heating efficiency. FIG. 9 illustrates an example PM sensor 900 that controls the flow rate of air. The PM sensor 900 includes a body 901 defining a channel configured to receive a stream of air from outside the body 901, e.g, via one or more fractionators configured to select for a particular size of PM. The PM sensor 900 receives the stream of air through an inlet 902. The stream of air passes through the channel at a flow rate. The PM sensor 900 also includes a mass-sensitive element 914 configured to receive a deposition of PM from the stream of air and to indicate a mass of the PM deposition. The PM sensor 900, for instance, may determine the mass concentration of PM of a particular size in the stream of air. The PM sensor 900 includes an air pump 910 coupled to the channel and operable at an adjustable speed that adjusts the flow rate of the stream of air in the channel. For instance, the air pump 910 may be a fan with an adjustable fan speed. After passing through the PM sensor 900, the stream of air exits the air outlet 912.

The PM sensor 900 includes one or more sensors 938 configured to determine and provide a signal indicating the flow rate in the channel. Correspondingly, the PM sensor includes circuitry 916 coupled to the air pump 910 and receives the signal from the one or more sensors 938. The circuitry 916 is configured to control the flow rate in the channel by adjusting the speed of the air pump 910 in response to the signal from the one or more sensors 938. In other words, the PM sensor 900 implements feedback control of the flow rate.

As shown FIG. 9, the circuitry 916 may include a comparator 916a and a feedback amplifier 916b. The comparator 916a compares the flow rate determined by the one or more sensors 938 to a setpoint (i.e., desired rate), which may also be adjusted. The difference between the signal and the setpoint is then communicated to the feedback amplifier 916b. The air pump 910 can be correspondingly adjusted to achieve the desired rate according to an amplifier signal from the feedback amplifier 916b. The feedback amplifier 916b, for instance, may employ proportional-integral-derivative control (PID) control. The circuitry 916 may adjust the speed of the air pump 910 to keep the flow rate in the channel substantially constant at a predetermined rate. This approach can be employed to achieve constant flow rate and constant velocity through a virtual impactor, for instance.

Figure 10:
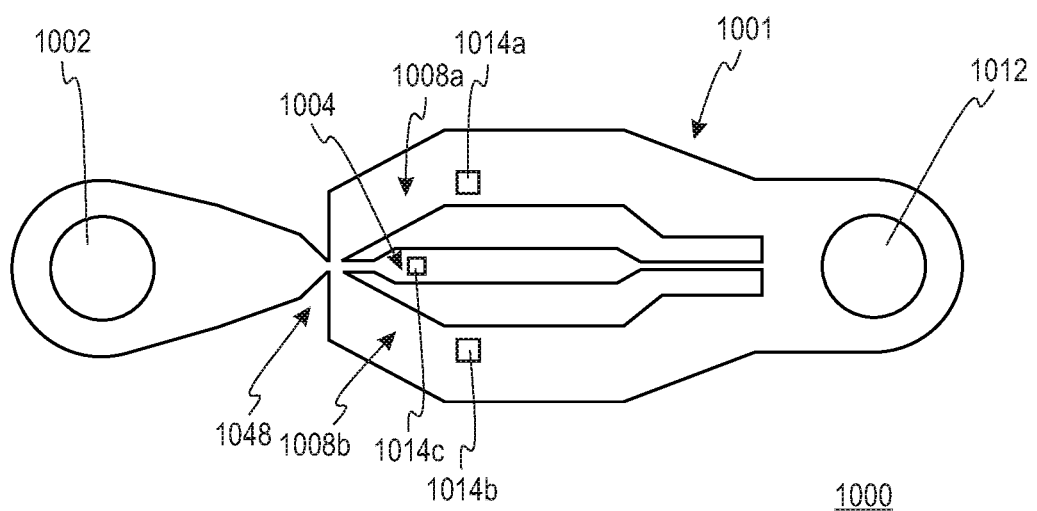
FIG. 10 illustrates an example PM sensor that can determine mass concentration of coarse PM in a stream of air, according to aspects of the present disclosure.

FIG. 10 illustrates an example PM sensor 1000 that can measure mass concentration of coarse PM in a stream of air. The PM sensor 1000 employs a virtual impactor 1048 as a PM size fractionator. The PM sensor 1000 includes a body 1001 that defines a minor channel 1004 for the minor flow from the virtual impactor 1048, as well as a first major channel 1008a and a second major channel 1008b for the major flows from the virtual impactor 1048. The PM sensor 1000 includes a plurality of mass-sensitive elements 1014a-c. The first mass-sensitive element 1014a is disposed in the first major channel 1008a and the second mass-sensitive element 1014b is disposed in the second major channel 1008b. The third mass-sensitive element 1014c is disposed in the minor channel 1004. Corresponding heating elements may be employed to produce temperature gradients to direct PM thermophoretically to the mass-sensitive elements 1014a-c.

In operation, a stream of air passes through the virtual impactor 1048 via an input 1002. The first major channel 1008a and the second major channel 1008b angle away from the minor channel 1004. PM with inertia exceeding a certain value is unable to follow the angles into the major channels 1008a, b and thus pass into the minor channel 1004. Accordingly, the first mass-sensitive element 1014a and the second mass-sensitive element 1014b can determine the mass associated with a deposition of smaller (fine) PM from the stream of air, while the third mass-sensitive element 1614c can determine the mass associated with a deposition of larger (coarse) PM from the stream of air.

As shown in FIG. 10, the first major channel 1008a and second major channel 1008b may be symmetrical airflow paths for receiving airstreams having smaller PM. In some embodiments, symmetrical airflow paths allow the pair of mass-sensitive elements 1014a, b to double the collection efficiency for PM of a particular size. Additional pairs of mass-sensitive elements may be employed to enhance collection efficiency further. Other types of sensors (e.g, temperature, pressure, and/or relative humidity sensors) may also be deployed in both the symmetrical airflow paths to at least double collection efficiency.

Aspects of the PM sensors 200, 300, 400, 500, or 600 described above may be implemented in alternative embodiments of the PM sensor 1000. For instance, the PM sensors 200, 300, 400 are configured to use a plurality of mass-sensitive elements in a single channel to provide a differential coupling to account for the effect of ambient conditions and/or to slow the fouling of the mass-sensitive elements. Accordingly, a plurality of mass-sensitive elements may be similarly implemented in any one (e.g., each) of the channels 1004, 1008a, b of the PM sensor 1000 to achieve the advantages of the PM sensor 200, 300, and/or 400. Meanwhile, PM sensors 500, 600 employ a plurality of heating elements in a single channel to thermophoretically cause deposition of a particular PM size on a single mass-sensitive element or a distribution of different PM sizes across a plurality of mass-sensitive elements. Accordingly, a plurality of heating elements and mass-sensitive element(s) may be similarly implemented in any one (e.g., each) of the channels 1004, 1008a, b of the PM sensor 1000 to achieve the advantages of the PM sensor 500 or 600.

Alternatively, as described further with reference to FIG. 3, the PM sensor 300 includes a first section 304a where a first mass-sensitive element 314 is positioned to receive a deposition of PM. Additionally, the PM sensor 300 includes a second section 304b where a second mass-sensitive element 314b is positioned but does not receive a deposition of PM. This configuration provides differential coupling of a mass-sensitive elements 314a, b to account for the effect of ambient conditions on the measurement of the mass associated with PM deposition. Similarly, in alternative embodiments of the PM sensor 1000, the first mass-sensitive element 1014a can be positioned in the first major channel 1008a to receive a PM deposition. Meanwhile, the second mass-sensitive element 1014b can be positioned in the second major channel 1008b, but the PM sensor 1000 is configured (e.g., with a filter, etc.) so that the second mass-sensitive element 1014b does not receive a deposition of PM. As such, a differential coupling can also be established between the first mass-sensitive element 1014a and the second mass-sensitive element 1014b to account for the effect of ambient conditions on the measurement of the mass associated with PM deposition.

Figure 11A:
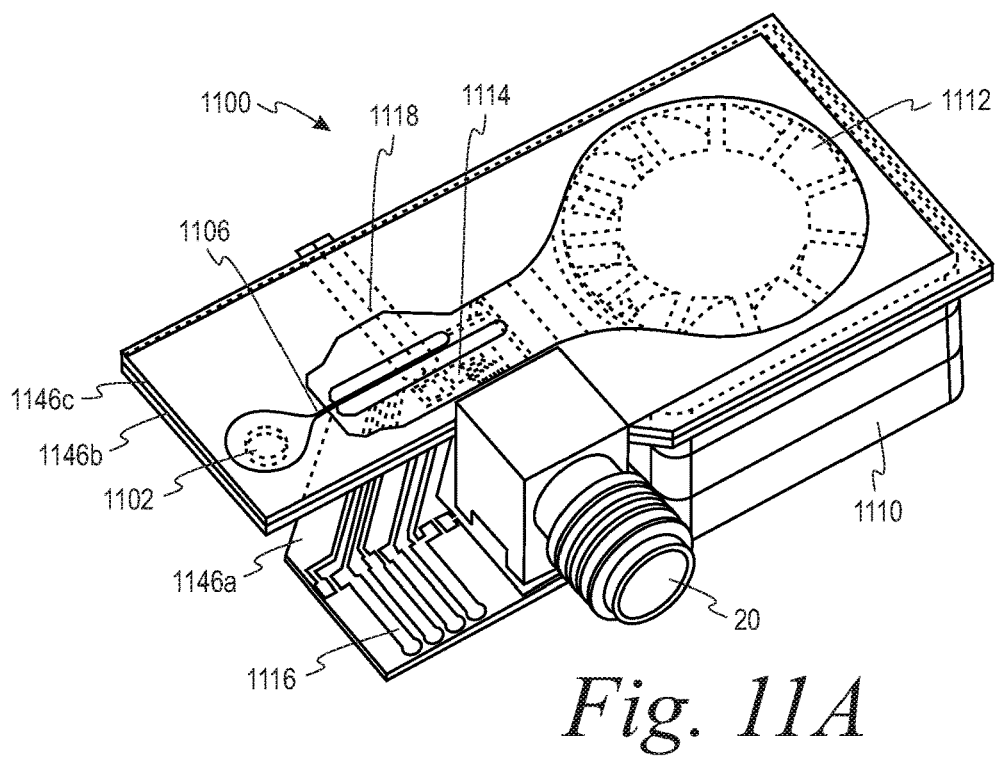
FIG. 11A illustrates an assembled view of an example PM sensor fabricated with wafers, according to aspects of the present disclosure.
Figure 11B:
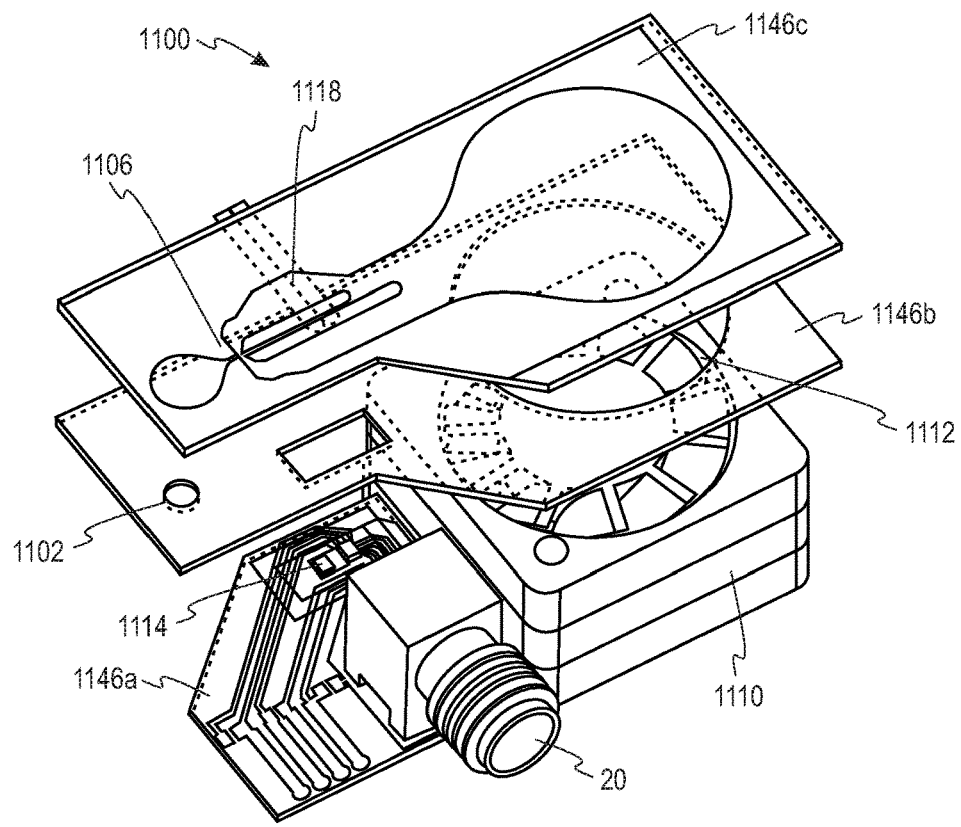
FIG. 11B illustrates an exploded view of the example PM sensor of FIG. 11A.

Referring to FIGS. 11A-B, aspects of an example PM sensor 1100 are configured to enhance manufacturability as well as sensitivity (signal-to-noise ratio), ruggedness, and expandability. The PM sensor 1100 includes an air inlet 1102, a microfluidic circuit 1106, an air pump 1110, an air outlet 1112, one or more mass-sensitive elements 1114, and circuitry 1116. The PM sensor may also include one or more corresponding heating elements 1118 to direct PM thermophoretically to the mass sensitive element 1114 as described above. The air pump 1110 moves air through the PM device 1100. Among other possible functions, the circuitry 1116 processes signals from the one or more mass-sensitive elements 1114 to determine a mass concentration measurement for PM in the airstream.

The microfluidic circuit 1106 is configured to provide a virtual impactor. In particular, the microfluidic circuit 1106 in communication with the air inlet 1102 includes a minor channel as well as a first major channel and a second major channel extending at an angle from the minor channel (see, e.g., the minor channel 1004 and major channels 1008a, b shown in FIG. 10). PM of a particular size that flow into the major channels is deposited on the mass-sensitive element 1114 for measurement. For instance, the virtual impactor directs PM on average smaller than 2.5 µm in aerodynamic diameter to the major channels, while the minor channel receives PM on average larger than 2.5 µm in aerodynamic diameter.

The PM sensor 1100 includes a bottom layer 1146a, a middle layer 1146b, and a top layer 1146c. In some embodiments, the layers 1146a-c are formed with microfabricated quartz wafers. In other embodiments, however, the layers 1146a-c may be formed with other materials. For instance, although the top layer 1146c may be formed from a quartz wafer, the middle layer 1146b may be formed from a silicon wafer, and the bottom layer 1146a may be a printed circuit board (PCB) formed with FR-4 glass epoxy. Advantageously, the use of a FR-4 PCB for the bottom later 1146a in particular may reduce manufacturing costs and improve yield.

Apertures and channels may be etched, drilled, or otherwise formed at one or more of the layers 1146a-c. Meanwhile, other components may be assembled on, and supported by, one or more of the layers 1146a-c.

The mass-sensitive element 1114 and the circuitry 1116 are assembled on the bottom layer 1146a. The mass-sensitive element 1114, for instance, may be a FBAR mounted on a PCB defining the bottom layer 1146a.

Apertures are formed in the middle layer 1146b for the air inlet 1102 and air outlet 1112. The middle layer 1146b also includes etched features of the virtual impactor and the channels through which the PM flows. Additionally, a cavity is formed in the middle wafer, through which the one or more mass-sensitive elements 1114 can communicate with the channels in the middle layer 1146b. Correspondingly, the top layer 1146c supports the one or more heating elements 1118 above the channels. Conductors on the underside of the top wafer connect the heating element to a power supply (not shown).

Wafer-to-wafer bonding may be employed to seal the middle wafer and top wafer of the PM sensor 1100. One bonding approach employs a dispenser printed and curable resist to bond the two wafers at the die level. According to aspects of the present disclosure, however, an alternative bonding approach involves wafer-level bonding with anodic bonding, thermocompression bonding, or glass fit bonding. Such wafer-to-wafer bonding increases fabrication throughput as it allows for wafer processing (versus die-sized) processing of the PM sensor 1100, while providing an improved seal for the middle wafer and the top wafer.

In some embodiments, markings are provided on each layer 1146a-c to allow for precise alignment/registration of the various components during fabrication/assembly. For instance, alignment/registration markings allow for automated placement of silicon dies (e.g., for mass-sensitive elements 1114) and registration for automated gold wire bonding of the silicon dies to the PCB defining the bottom layer 1146a. Additionally, such markings allow for precise automated alignment of the middle layer 1146b (including the virtual impactor and channels) with the top layer 1146c (including the heating elements 1118) over the bottom layer 1146a (including the mass-sensitive elements 1114 on the PCB).

Some embodiments may employ a board outline to align and integrate an inlet port for the air inlet 1102 and an outlet port for the air outlet 1112, thereby providing a sturdy surface to attach a hose barb, a fan, and/or an intake/exhaust manifold. Some embodiments may implement stand-offs to secure the assembled layers 1146a-c of the PM sensor 1100 to a base-board. Alternatively, the assembled layers 1146a-c may be housed in an enclosure.

In general, aspects of the circuitry 1116 generate RF signals to communicate mass concentration measurement data. For instance, FIGS. 11A-B illustrate an RF coaxial connector 20 coupled to the circuitry 1116 on the bottom layer 1146a to communicate the RF signal to an external device 10 for further processing. Additionally or alternatively, a wireless device may be coupled to or integrated with to communicate the mass concentration measurement data wirelessly to the external device 10 for further processing. Thus, RF signals generated by the circuitry 1116 may be transmitted to the external device 20 via the wireless device.

Some embodiments may include features, such as electromagnetic shielding, to mitigate electromagnetic interference (EMI) or electromagnetic signal loss. Such features may ensure compliance with electromagnetic compatibility (EMC) regulations.

In particular, the PM sensor 1100 can mitigate losses associated with RF signals. According to one approach, RF output traces are matched to 50 Ohms. Advantageously, this can reduce step impedance changes and prevent signal reflection and corresponding noise spikes and reduction of signal at output. Additionally, blind vias may also be implemented with the RF output traces to eliminate the use of stubs that might otherwise result in signal noise. Moreover, a Faraday cage may be employed around the RF signals to reduce EMC radiated emissions.

To enhance manufacturability further, test-points can be employed such that RF components can be evaluated during fabrication. For instance, the PCB may incorporate 90-100% test point coverage for flying probe verification of the bare and assembled board.

Figure 15:
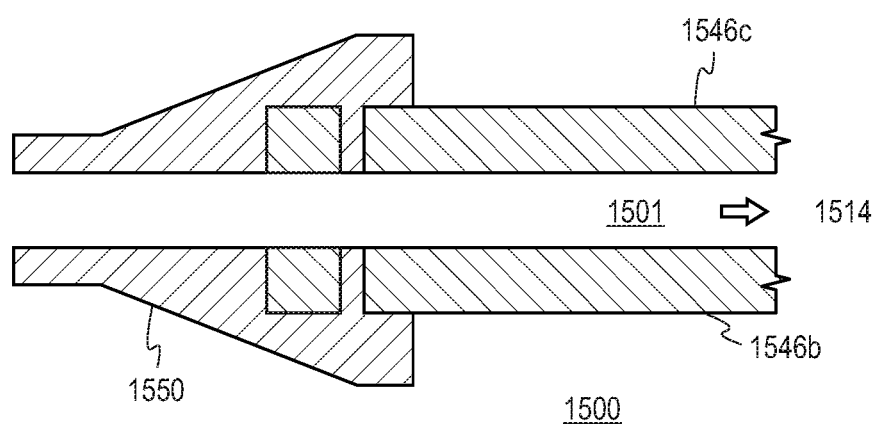
FIG. 15 illustrates an example PM sensor that employs an in-plane inlet, according to aspects of the present disclosure.

As described above, the stream of air with PM flows in channels that extend along the middle layer 1146b. In some embodiments, the inlet 1102 extends from the top layer 1146c, such that the air flows down from the top layer 1146c and meets the channels at 90°. Such a configuration is known as an out-of-plane inlet as the air is not introduced along the plane defined by the middle layer 1146c. FIG. 15 illustrates an alternative embodiment for the inlet for a PM sensor 1500. In particular, the PM sensor 1500 includes a top layer 1546c and a middle layer 1546b. A channel 1504 is defined by and extends along the middle layer 1546b. The channel 1504 directs a stream of air to a mass-sensitive element 1514 as described above. Rather than introducing a stream of air from above (or below) via an out-of-plane inlet, however, the PM sensor 1500 introduces air into the channel 1504 along the plane defined by the middle layer 1546b. The configuration in the PM sensor 1500 is known as an in-plane inlet. Advantageously, the use of an in-plane inlet reduces possible wall losses. The PM sensor 1500 may employ a fixture 1550 to provide an interface/adapter to other upstream features of the PM sensor 1500, such as another inlet, channels, other microfluidic circuits, microfabricated components, a filter, etc. The fixture 1550 may be separated fabricated and coupled to the middle layer 1546b. In particular, the fixture 1550 may be 3D printed.

Figure 12A:
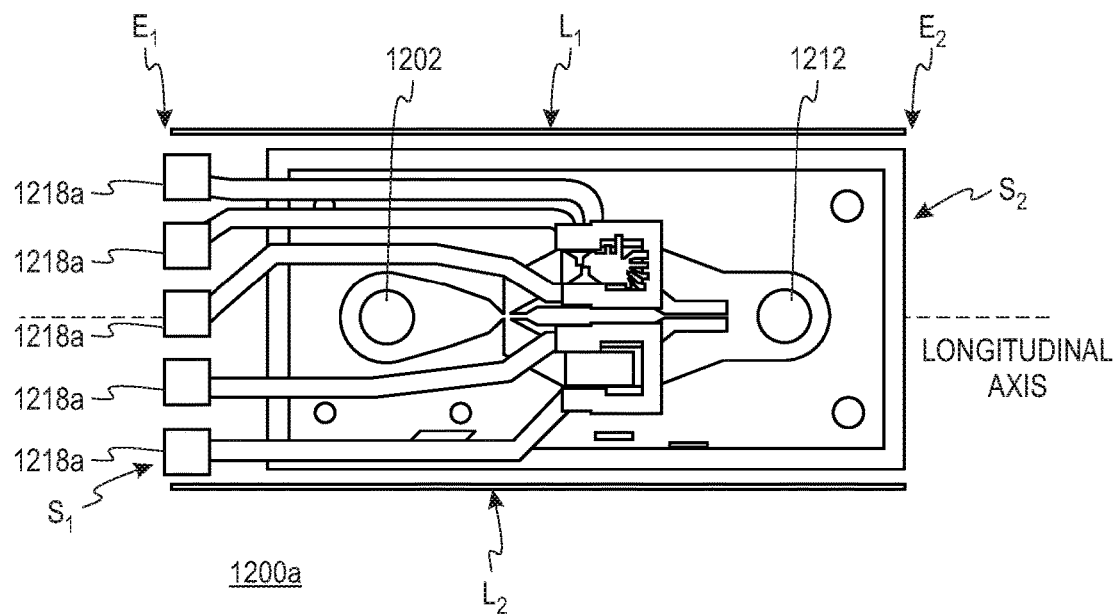
FIG. 12A illustrates an example PM sensor with a connector configuration that allows the PM sensor to be assembled with a more compact size, according to aspects of the present disclosure.

FIG. 12A illustrates an example PM sensor 1200a that allows PM sensors to be assembled with more compact sizes. Like the PM sensor 1100 described above, the PM sensor 1200a is assembled with a stack of three wafers and includes one or more heating elements fabricated on one of the wafers (e.g., the top wafer). The heating elements have corresponding connectors 1218a, for instance, to receive electrical power from a power source. As shown in FIG. 12A, the PM sensor 1216a is defined by: (i) two opposing long sides $L_1$, $L_2$ that extend along a longitudinal axis between two ends $E_1$, $E_2$, and (ii) two opposing short sides $S_1$, $S_2$ at the ends $E_1$, $E_2$, respectively, extending transversely to the longitudinal axis. The connectors 1218a can be arranged at the end $E_1$ along the short side $S_1$ as shown in FIG. 12A. The PM sensor 1200a includes an air inlet 1202 and an air outlet 1212, where the air inlet 1202 is more proximate to the end $E_1$ and the air outlet 1212 is more proximate to the end $E_2$. As such, the connectors 1218a are upstream of the stream of air received by the PM sensor 1200a for measurement of PM concentration.

Figure 12B:
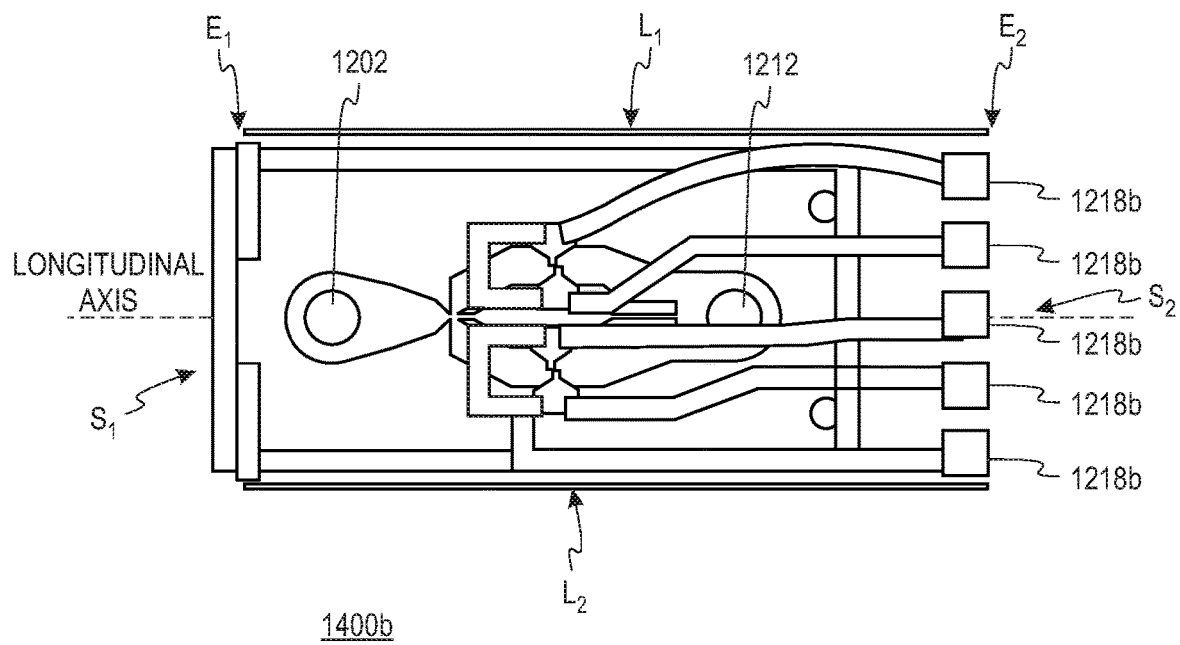
FIG. 12B illustrates an example PM sensor with an alternative connector configuration that allows the PM sensor to be assembled with a more compact size, according to aspects of the present disclosure.

An alternative PM sensor 1200b is shown in FIG. 12B. The PM sensor 1200b includes heating elements with corresponding connectors 1218b. Like the PM sensor 1200a, the PM sensor 1200b is defined by: (i) two opposing long sides $L_1$, $L_2$ that extend along a longitudinal axis between two ends $E_1$, $E_2$, and (ii) two opposing short sides $S_1$, $S_2$ at the ends $E_1$, $E_2$, respectively, extending transversely to the longitudinal axis. The connectors 1218b are arranged at the end $E_2$ along the short side $S_2$. With the air inlet 1202 more proximate to the end $E_1$ and the air outlet 1212 more proximate to the end $E_2$, the connectors 1218a are downstream of the stream of air received by the PM sensor 1200b for measurement of PM concentration.

According to other approaches, the connectors for heating elements in a PM sensor can be arranged along one of the long sides, e.g., $L_1$, $L_2$. The position of the connectors along one of the long sides, however, requires the PM sensor to be wider than an otherwise similar PM sensor with connectors along the short sides, e.g., $S_1$, $S_2$. The slimmer configurations shown in FIGS. 12A-B advantageously allow the PM sensors 1200a, b to be smaller and more compact.

Figure 13:
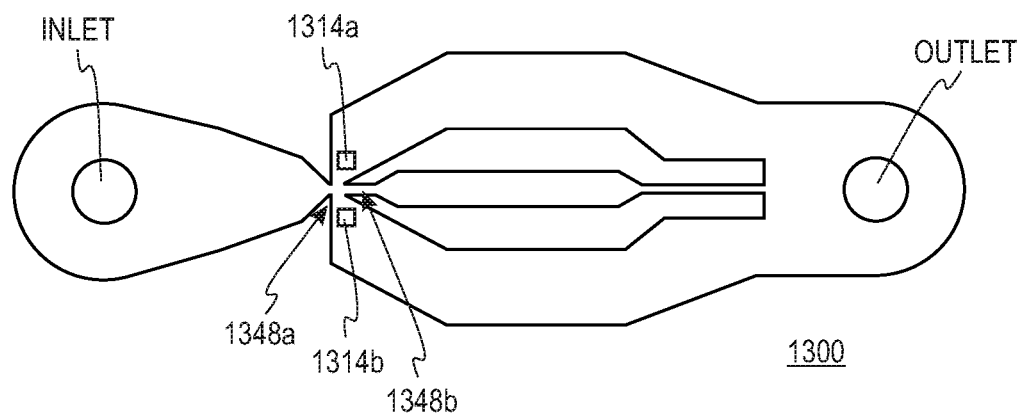
FIG. 13 illustrates an example PM sensor with mass-sensitive elements disposed in close proximity to an acceleration jet of a virtual impactor, allowing the PM sensor to be assembled with a more compact size, according to aspects of the present disclosure.

FIG. 13 illustrates further an example PM sensor 1300 that also allow PM sensors to be assembled with more compact sizes. The PM sensor 1300 employs a virtual impactor 1348 with an acceleration jet 1348a and a collection probe 1348b to provide a fractionator. As shown in FIG. 13, the PM sensor 1300 includes mass-sensitive elements 1314a, b disposed in close proximity to the acceleration jet 1348a of the virtual impactor 1348. Corresponding heating elements may be employed to produce temperature gradients to direct PM thermophoretically to the mass-sensitive elements 1314a, b. The distance between the mass-sensitive elements 1314a, b and the nozzle 1348 can be minimized based on computation fluid dynamic (CFD), such that the PM sensor 1300 can be as compact as possible. The position of the mass-sensitive elements 1314a, b within the PM sensor 1300 can be further optimized to use the concentration effect of the fractionator and to select for an appropriate size of the particles, possibly to compensate for the preferential deposition of the heating elements to varying PM size.

Figure 14:
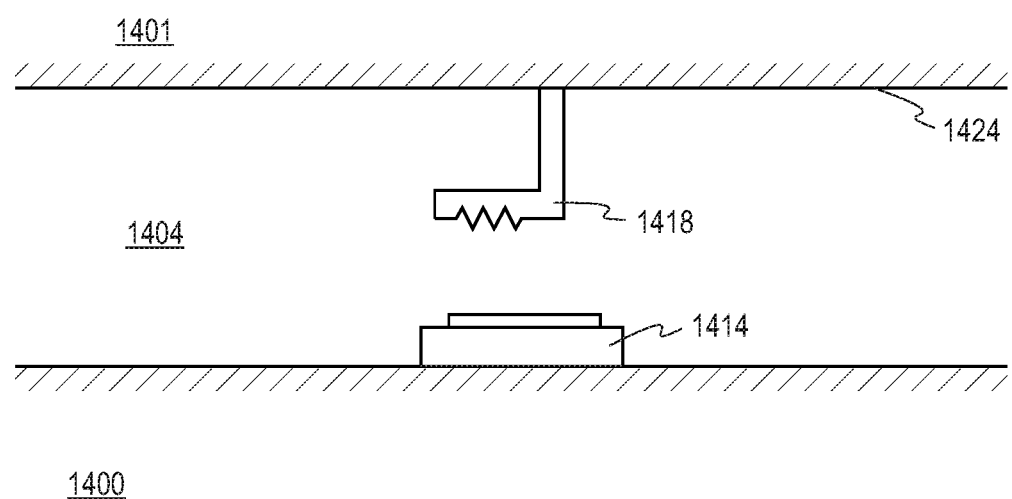
FIG. 14 illustrates an example PM sensor with a heating element disposed in close proximity to a mass-sensitive element, allowing the PM sensor to be assembled with a more compact size, according to aspects of the present disclosure.

FIG. 14 illustrates further an example PM sensor 1400 that allow PM sensors to be assembled with more compact sizes. The PM sensor 1400 includes a body 1401 defining a channel 1404 configured to receive a stream of air from outside the body 1401, e.g., via one or more fractionators configured to select for a particular size of PM. The PM sensor 1400 includes a mass-sensitive element 1414 in the channel 1404. The PM sensor 1400 also includes a heating element 1418 to produce a temperature gradient to direct PM thermophoretically to the mass-sensitive element 1414. As shown in FIG. 14, the heating element 1418 extends a distance from the top surface 1424 toward the middle of the channel 1404 and closer to the mass-sensitive element 1414. The approach shown in FIG. 14 is more advantageous than conversely moving the mass-sensitive element 1414 toward the middle of the channel 1404, as the mass-sensitive element 1414 is more likely to block desired flow through the channel 1404. Indeed, the heating element 1414 can employ smaller wires or resistors to reduce any effect on the flow through the channel 1404. To fabricate the PM sensor 1400, parts of the heating element 1414 can be formed from a sacrificial material that can be easily removed to achieve a shape similar to that in FIG. 14 for instance.

Having described the invention in detail and by reference to specific embodiments thereof, it will be apparent that modifications and variations are possible without departing from the scope of the invention as set forth in the present disclosure. More specifically, although some aspects of the present invention are identified herein as particularly advantageous, it is contemplated that the present invention is not necessarily limited to these particular aspects of the invention.

What is claimed is:

1. A sensor for detecting particulate matter (PM) pollutants, comprising:
   a body defining a main channel configured to receive a stream of air from outside the body and one or more fractionators operatively linked to the channel and configured to select for a particular size of PM;
   a plurality of mass-sensitive elements, wherein
   a first of the mass-sensitive elements is disposed in the main channel and configured to receive a deposition of PM from the stream of air and to provide a first signal indicating a measurement of a mass of the PM deposition; and
   a second of the mass-sensitive elements is configured to detect an effect of one or more ambient conditions on the mass-sensitive elements corresponding to the measurement of the mass of the PM deposition and to provide a second signal indicating the effect of the one or more ambient conditions on the mass-sensitive elements, wherein the body defines a dead end side channel extending from the main channel, and wherein the second mass-sensitive element is disposed in the dead end side channel such that PM are not deposited on the second mass-sensitive element.

2. The sensor of claim 1, wherein the effect of the one or more ambient conditions on the first mass-sensitive element includes at least one of a temperature effect or a humidity effect.

3. The sensor of claim 1, wherein the plurality of mass-sensitive elements are resonators, and each mass-sensitive element has a resonant frequency that changes in response to the PM deposition and the one or more ambient conditions, the first signal from the first mass-sensitive element reflecting a change in the resonant frequency in response to both the PM deposition and the one or more ambient conditions, and the second signal from the second mass-sensitive element reflecting a change in the resonant frequency in response to only the one or more ambient conditions.

4. The sensor of claim 1, further comprising circuitry configured to receive the first signal from the first mass-sensitive element and the second signal from the second mass-sensitive element,
determine the effect of the one or more ambient conditions on the first mass-sensitive element according to the second signal,
correct the mass of the PM deposition indicated by the first signal according to the effect of the one or more ambient conditions on the first mass-sensitive element, and
determine a concentration of the PM in the stream of air according to the mass of the PM deposition.

5. The sensor of claim 1, further comprising a first heating element proximate to the first mass-sensitive element and operable to produce a temperature gradient in the main channel that causes the PM deposition on the first mass-sensitive element.

6. The sensor of claim 5, wherein a third of the mass-sensitive elements is disposed in the main channel, and a second heating element is proximate to the third mass-sensitive element and operable to produce another temperature gradient in the main channel that causes another PM deposition on the third mass-sensitive element, the third mass-sensitive element providing a third signal indicating a mass of the other PM deposition.

7. The sensor of claim 6, wherein the first heating element and the second heating element are selectively operated to control the respective PM depositions on the first mass-sensitive element and the third mass-sensitive element.

8. The sensor of claim 7, wherein the only one of the first mass-sensitive element or the third mass-sensitive element receives the respective PM deposition at a given time.

9. The sensor of claim 6, wherein the body defines a side channel extending from the main channel and the second mass-sensitive element is disposed in the side channel.

10. The sensor of claim 1, wherein the main channel includes a first section and a second section, the first mass-sensitive element is disposed in the first section, the second mass-sensitive element is disposed in the second section, and the PM is directed to the first section and away from the second section.

11. The sensor of claim 10, further comprising a filter configured to block the PM in the stream of air from passing into the second section.

12. The sensor of claim 10, wherein the PM in the stream of air is directed away from the second section and to the first section via thermophoresis or electrophoresis.

13. The sensor of claim 10, the PM is separated between the first section and the second section by laminar airflow in the main channel, or the sensor further comprises a barrier configured to separate the first section and the second section.

14. The sensor of claim 1, further comprising one or more separate sensors for the one or more ambient conditions, wherein the effect of the one or more ambient conditions on the mass-sensitive elements is further determined according to measurements from the one or more separate sensors.

15. A sensor for detecting particulate matter (PM) pollutants, comprising:
a body defining a channel configured to receive a stream of air from outside the body and one or more fractionators operatively linked to the channel and configured to select for a particular size of PM;
a plurality of mass-sensitive elements disposed in the channel, wherein:
a first of the mass-sensitive elements is configured to receive a first deposition of PM of the particular size from the stream of air and to provide a first signal indicating a measurement of a mass of the PM deposition;
a second of the mass-sensitive elements is configured to receive a second deposition of PM of the particular size from the stream of air and to provide a second signal indicating a mass of the second PM deposition;
circuitry configured to alternately operate the first mass-sensitive element and the second mass-sensitive element, such that at most one of the first mass-sensitive element or the second mass-sensitive element receives the first PM deposition or second PM deposition, respectively, at any given time; and
a third of the mass-sensitive elements is configured to detect an effect of one or more ambient conditions on the mass-sensitive elements corresponding to the measurement of the mass of the first PM deposition or the second PM deposition and to provide a third signal indicating the effect of the one or more ambient conditions on the mass-sensitive elements; and
a plurality of heating elements, wherein:
a first of the heating elements is proximate to the first mass-sensitive element and is operable to produce a first temperature gradient that causes the first PM deposition on the first mass-sensitive element;
a second of the heating elements is proximate to the second mass-sensitive element and operable to produce a second temperature gradient that causes the second PM deposition on the second mass-sensitive element,
wherein the circuitry is additionally configured to alternately operate the first of the heating elements and the second of the heating elements so that at most one of the first mass-sensitive element or the second mass-sensitive element receives the first PM deposition or the second PM deposition, respectively, at any given time.

16. The sensor of claim 15, wherein the first heating element or the second heating element are selectively operated so that only one of the first mass-sensitive element or the second mass-sensitive element receives at a given time the first PM deposition or the second PM deposition, respectively.

17. The sensor of claim 15, wherein when only one of the first mass-sensitive element or the second mass-sensitive element receives the first PM deposition or the second PM deposition, and the other of the first mass-sensitive element or the second mass-sensitive element is configured to provide another signal indicating an effect of one or more ambient conditions on the mass-sensitive elements.

18. The sensor of claim 17, wherein the plurality of mass-sensitive elements are resonators, and each mass-sensitive element has a resonant frequency that changes in response to the PM deposition and the one or more ambient conditions, the one of the first mass-sensitive element or the second mass-sensitive element providing a signal reflecting a change in the resonant frequency in response to both the PM deposition and the one or more ambient conditions, and the other of the first mass-sensitive element or the second mass-sensitive element providing a signal reflecting a change in the resonant frequency in response to only the one or more ambient conditions.

19. The sensor of claim 15, wherein the main channel includes a first section and a second section, the first mass-sensitive element is disposed in the first section, the second mass-sensitive element is disposed in the second section, and the PM sensor includes a redirection mechanism that alternately directs the PM to the first section or the second section so that only one of the first mass-sensitive element or the second mass-sensitive element receives at a given time the first PM deposition or the second PM deposition, respectively.

20. The sensor of claim 19, wherein the redirection mechanism employs thermophoresis or electrophoresis to direct the PM to the first section or the second section.

21. The sensor of claim 15, wherein the mass-sensitive elements includes at least one additional mass-sensitive element configured to receive an additional deposition of PM from the stream of air and to provide an additional signal indicating a mass of the additional PM deposition; and the heating elements include at least one additional heating element proximate to the at least one additional mass-sensitive element and operable to produce an additional temperature gradient that causes the additional PM deposition on the at least one additional mass-sensitive element, wherein the first heating element, the second heating element, and the at least one additional heating element are alternately operated to control the respective PM depositions on the first mass-sensitive element, the second mass-sensitive element, or the at least one additional mass-sensitive element.

22. A sensor for detecting particulate matter (PM) pollutants, comprising a body defining a channel configured to receive a stream of air from outside the body via one or more fractionators configured to select for PM having a size less than a threshold size;

one or more mass-sensitive elements disposed in the channel; and a plurality of heating elements arranged in series in the channel and operable to produce a temperature gradient that causes deposition of PM in a size-dependent manner along a length of the channel such that a size of PM received by deposition by a first mass-sensitive element of the one or more mass-sensitive elements is determined by the position of the first mass-sensitive element in the channel relative to the heating elements, wherein the size of PM received by the first mass-sensitive element is less than the threshold size, and wherein the mass-sensitive element is configured to provide a signal indicating a mass of the PM deposition.

23. The sensor of claim 22, wherein the sensor includes a plurality of the mass-sensitive elements arranged in series in the channel, each heating element is paired with a respective one of the mass-sensitive elements, and each mass-sensitive element receives a different respective size of PM.

24. The sensor of claim 22, wherein the sensor includes a single mass-sensitive element adjustably positioned relative to the plurality of heating elements to receive a selected size of PM that is less than the threshold size according to the temperature gradient produced by the heating elements.

25. The sensor of claim 22, wherein the one or more mass-sensitive elements are resonators, and each mass-sensitive element provides the signal based on a change in resonant frequency in response to the PM deposition.

* * * * *